United States Patent [19]

Kopp

[11] 3,858,333

[45] Jan. 7, 1975

[54] EDUCATIONAL GAME APPARATUS
[76] Inventor: Warner Kopp, Brookwood Dr., Stanhope, N.J. 07874
[22] Filed: Feb. 1, 1973
[21] Appl. No.: 328,771

[52] U.S. Cl............... 35/35 J, 273/135 D, 273/146
[51] Int. Cl............................................. G09b 1/32
[58] Field of Search ....... 35/35 R, 35 H, 35 J, 31 F, 35/31 G, 69, 70, 71, 72, 73; 273/146, 135 D

[56] References Cited
UNITED STATES PATENTS
1,584,316  5/1926  Mayhew............................. 273/146
1,693,711  12/1929 Fritz.................................. 35/35 H
2,491,883  12/1949 Welch................................ 35/71

FOREIGN PATENTS OR APPLICATIONS
855,573  2/1940  France............................... 273/146

OTHER PUBLICATIONS
"Scrabble" Crossword Cubes; Selchow & Righter One Hundredth Anniversary Game Catalog, pages 12 & 13.
Webster's Third New International Dictionary, page 569, illustration accompanying the definition of "Dactylology".
"Scrabble" Ad, Selchow & Ricter One Hundredth Anniversary Game Catalog, page 10.

Primary Examiner—Wm. H. Grieb
Attorney, Agent, or Firm—Richard N. Miller

[57] ABSTRACT

Educational game apparatus for teaching sign language which comprises at least one set of at least five cubes, each cube face bearing indicia corresponding to a letter of the sign language alphabet or a word in the sign language, and at least one interpreter card bearing the entire sign language alphabet and any word signs appearing on the cubes together with the native tongue alphabetic or word equivalents thereof, whereby the cubes may be tossed and the letters or signs thereon identified.

6 Claims, 4 Drawing Figures

Patented Jan. 7, 1975

3,858,333

EDUCATIONAL GAME APPARATUS

BACKGROUND OF INVENTION

This invention relates to educational and amusement game apparatus adapted for use by one or more persons and effective for teaching sign lanquage. More particularly, it relates to a unique combination of at least one set of at least five cubes provided on their faces with indicia corresponding to the sign lanquage alphabet and an interpreter card bearing the sign language alphabet and the native tongue equivalents.

Various educational games employing cubes have been employed in the past but such games have generally utilized either cubes bearing letters of the Roman alphabet or arabic numerals and mathematical symbols. In these games the cubes were tossed and words were built from the letters obtained by chance or mathematical equations were constructed from the numbers and symbols obtained by chance.

The present game differs from the known games because it teaches the players a new language and develops their skill in using the language to communicate. For example, it teaches the sign language alphabet and the use of this alphabet in constructing words in addition to aiding in the expansion of vocabulary and in a better understanding of spelling. Also, the game is so constructed that any number of players may participate either as individuals or as partners. Thus, the game educates both the players and the onlookers while at the same time providing intellectual stimulation and amusement for all.

The educational game apparatus of this invention provides an effective, enjoyable means of teaching the sign language to both children and adults. At the present time sign language is the universal method of communication for deaf and deaf-mute persons. However, since sign language is basically the same for persons of all different nationalities, it can be used as a universal language even for people of normal hearing. In addition, sign language has specific utility to people of normal hearing working within sight of one another but in noisy surroundings, e.g., building construction workers and firemen in a large crowd, or to people working in special occupations where oral communication is not possible, e.g., skin divers. Also, sign language has utility in military intelligence where bugging devices are present as well as utility as an elite language for special groups such as clubs. Thus, the inventive game provides a fast and easy way of learning sign language which will serve to bring people closer together through better communication.

SUMMARY OF THE INVENTION

The inventive educational game apparatus for teaching sign language comprises at least one set of at least five cubes, each cube face bearing indicia corresponding to a letter of the sign language alphabet or a number in sign language or a word in the sign language, said cube faces containing all twenty-six letters of the sign language alphabet; and at least one interpreter card bearing the entire sign language alphabet and any word signs appearing on the cubes together with the native tongue alphabetic or word equivalents thereof, whereby the cubes may be tossed and the letters or signs thereon identified by the player either with or without reference to the interpreter card. Preferably, each cube face also will include a numerical score value in addition to the letter of the hand alphabet or the sign for a word in the sign language.

In a particularly preferred form suited for use by a number of individuals or at least two sets of partners, the game apparatus comprises at least one set of from 12 to 18 cubes, each cube face bearing indicia corresponding to a letter of the sign language alphabet and a numerical score value, with all twenty-six letters of the alphabet being represented and at least about 25 percent of the available cube faces having vowel signs; and at least one interpreter containing the basic or native tongue alphabetic equivalents of the sign language alphabet whereby the players accumulate points by associating the tossed or spilled cubes to form at least one word, e.g., the longest word possible or a plurality of words in crossword fashion.

Optionally, the same apparatus may further include a timer or a playing board having delineated areas for forming words or a shaker cup or a combination of two or three of the foregoing auxiliary items. Additionally, the playing board may include bonus areas where the score value is increased if a cube is placed on that spot.

The term sign language as used herein refers to dactylology or mute sign language and includes the hand alphabet or finger spelling as well as any hand sign used to convey a word, number or phrase. Both the hand alphabet and/or hand signs may be employed where the players accumulate points by correctly identifying the letter or word; whereas, the hand alphabet is especially suitable when the game apparatus is used for forming words.

DETAILED DESCRIPTION OF THE INVENTION

Specific embodiments of the invention have been chosen for purposes of illustration and description and are shown in the accompanying drawings where:

Figure 1:
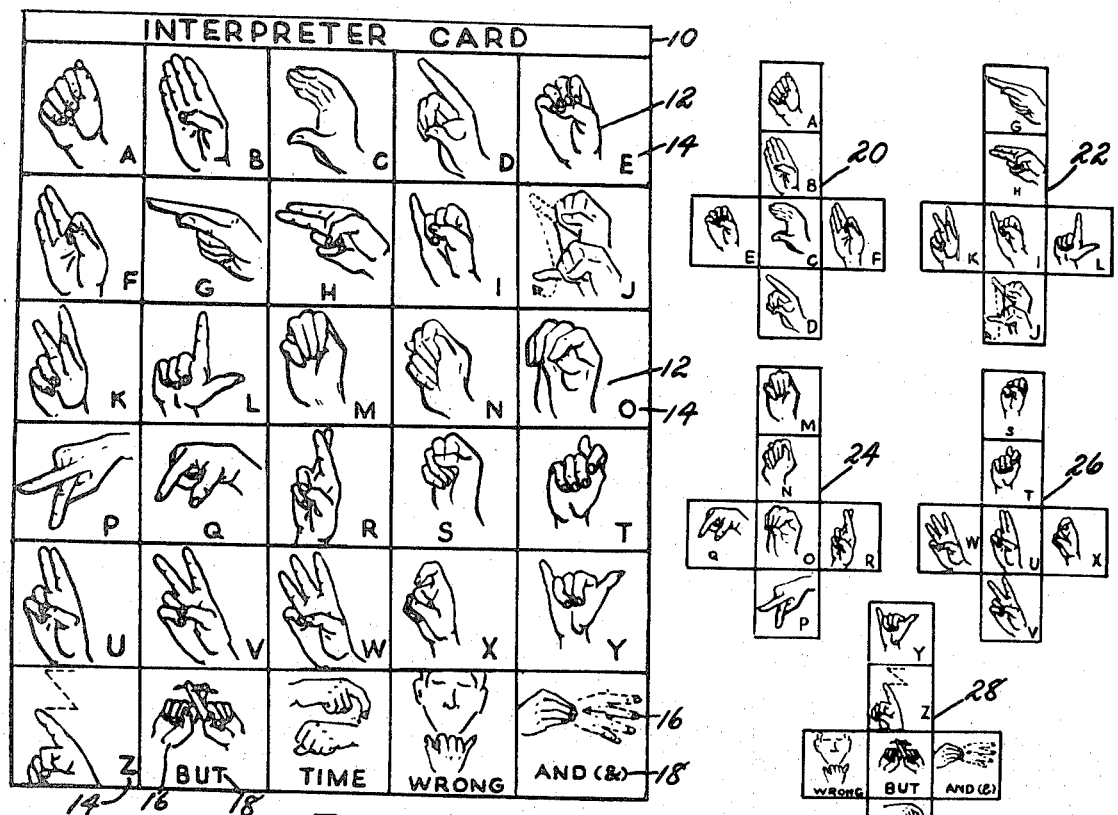
FIG. 1 is a plan view of an interpreter card made in accordance with the invention.

Referring to FIG. 1 an interpreter card 10 is shown which bears the hand signs 12 representing the 26 letters of the sign language alphabet together with the Roman aplhabetic equivalents 14 of the sign language alphabet. Also illustrated are four hand signs 16 for words in sign language and the Roman alphabetic equivalents 18 thereof. The interpreter card 10 will generally be made by printing on either paper or cardboard. At least one interpreter card is required in each game apparatus, but sufficient additional cards may be included to provide one for each individual player or one for each set of partners.

The basic or native tongue equivalents 14 and 18 on interpreter card 10 are shown in the Roman alphabet. However, non-Roman alphabetic equivalents may obviously be substituted for the Roman equivalents 14 and 18. Other alphabets which may be substituted for the Roman alphabet include the Hebrew, Arabic, Greek, Russian and Sanskrit alphabets.

Figure 2:
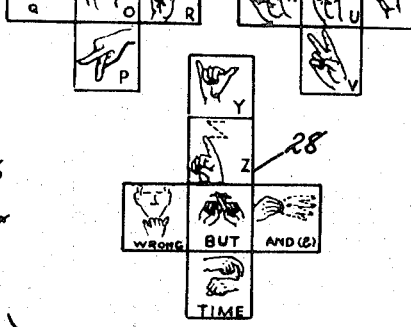
FIG. 2 is a schematic view showing five of the cubes of the invention in expanded or unfolded form.

FIG. 2 depicts shematically and in exploded fashion the sign language bearing faces of the minimum number of five cubes designated 20, 22, 24, 26, and 28 which are defined on interpreter card 10 of FIG. 1. These cubes comprise a set since each hand sign on interpreter card 10 appears only once on the faces thereof and the resultant set includes indicia corresponding to all of the letters of the sign language alphabet together with four word signs therein.

Although a total of five cubes has been disclosed as being the minimum because at least 26 faces are required to depict each of the letters of the sign language alphabet with four blank faces remaining, it is obvious that the minimum numbers of cubes will increase at the rate of one cube for each six additional sign words in excess of the four shown on the interpreter card 10. Since over 1,500 hand signals for words are known and used, the minimum number of cubes required to depict all hand signals and the sign language alphabet would exceed 255. However, as more than about 24 cubes are difficult to handle at one time, it is apparent that the number of items listed on the interpreter card generally will not exceed 144 unless dies having more than six faces are used. While dies having up to 26 faces (18 square faces and eight triangular faces) are known and are within the scope of this invention, the preferred embodiments depicted employ the common, readily recognized, readily available cubes.

The depicted cubes may be made out of any suitable material such as wood, bone or plastic material by any known process. Further, the sign language alphabet and/or hand signs may be placed on the cubes in any suitable manner such as by printing, silk screening, stamping, or embossing. Thus, the signs may be coplanar with the cube surface or indented in the surface or projecting from the surface, with the first two forms being most desirable.

Figure 3:
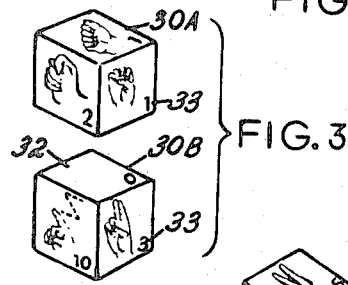
FIG. 3 is a perspective view of two cubes of the invention which are suitable for use in the particularly preferred word forming game apparatus.

FIG. 3 is an isometric view of two of the cubes 30A and 30B employed in the preferred game apparatus by the use of which words are formed from the spilled or tossed cubes. Both consonant signs and vowel signs in the sign language alphabet appear on each of dies 30A and 30B, with at least two vowel signs appearing on die 30A. A blank space 32 appears on die 30B and this space may be employed for either a consonant sign or a vowel sign in the ultimate formed word or words.

As the cubes 30A and 30B form part of a set of from 10 to 18, most preferably 15, cubes which are spilled to form a word or words, it has been found desirable to place signs for vowels on at least 25 percent of the available cube faces in order to facilitate combination of the cubes to form words. Further, the signs for vowels and consonants are distributed throughout the set of pieces in a manner designed to result in the possibility of forming a vast number of words in the dictionary. For example, vowel signs appear on at least 25 percent of the cube faces and, with the exception of signs for J, Q, V, X and Z, the signs for each consonant appear at least about twice, with the consonant signs which tend to occur together frequently being placed on different cubes.

Each of the cubes 30A and 30B further includes a numerical score value 33 on each face thereof. Those numerical score values 33 facilitate scoring and thereby lead to development of vocabulary and spelling skills because a premium is placed upon the use of a maximum number of signs representing letters having the highest values.

Figure 4:
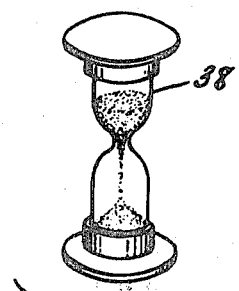
FIG. 4 is a plan view of a playing board particularly useful in certain embodiments of the invention.
Figure 4:
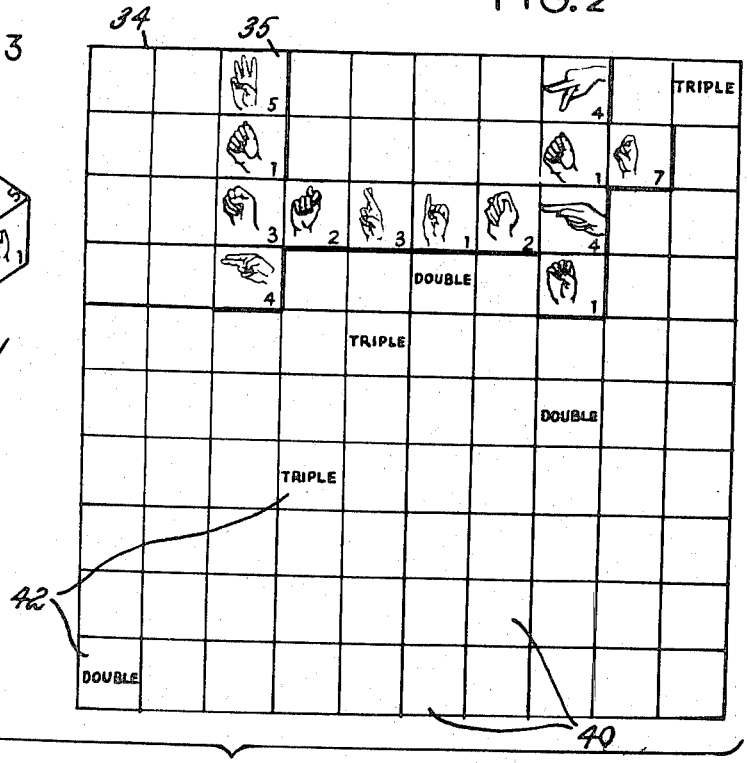

FIG. 4 depicts a set of fifteen of the cubes of the type shown in FIG. 3, with thirteen cubes 35 being arranged to form words crossword fashion on a playing board 34 shown in plan view and two cubes 31 not used in forming words on the board shown in isometric view together with an isometric view of an hourglass timer 38.

The playing board 34 is divided into playing squares 40 having an area slightly larger than the area of the face of cubes 35, with some of the squares 42 indicating an adjustment of the score if a cube is placed upon that particular spot. The squares 42 indicating an adjustment of score may be marked by printing words or numbers thereon or using different coloring. Use of a playing board of this type further increases the complexity of the game and skill development.

Timer 38 is provided to prevent a player from prolonging play unduly by limiting a player to a given number of minutes in which to complete his turn in a word-making game. Alternatively, the timer may be used to define the period in which a player may accumulate points by either correctly identifying the sign language alphabet or word signs or by forming words from the cubes which will be spilled a plurality of times during the period. The timer 38 may be the hourglass type shown or a mechanical type. A plurality of timers may be employed so that if a player completes his play in less than the prescribed time, the next player may proceed using another timer.

In operation, when the minimum number of five cubes are employed, a player may continuously accumulate points at the rate of one point per cube by correctly identifying the basic or native tongue equivalent of the sign language alphabet or word sign without reference to the interpreter card. In the event of an error in identification which is successfully challenged by another player, the first player may be penalized a predetermined number, e.g., five or 10, points, and the challenger may be credited with a predetermined number, e.g., 5 points, if the challenge is made without reference to the interpreter card. A bonus of two points can optionally be awarded to the successful challenger who referred to the interpreter card before challenging. Alternatively, a timer may be included in the game apparatus and each player may accumulate points for each successful identification during a set time period with similar consequences in the event of a successful challenge of an incorrect identification. If desired, numerical score values also may be included on each face of the cube and used to determine the score.

The complexity of the foregoing game operation may be increased by adding word signs to the cube faces and by increasing the number of cubes from five to some number less than about 24. The interpreter cards can also be modified in a similar fashion.

In the preferred game, from ten to eighteen, preferably fifteen, cubes bearing only the finger spelling alphabet are employed with all letters of the alphabet being represented at least once and with at least 25 percent of the cube faces being signs for vowels. In addition, each face further includes a numerical score value. A timer is included in the game apparatus and the timer is started as soon as the cubes are spilled out. Words are formed by the player crossword fashion to achieve the highest possible score during the time period. Blank faces may be used for any letter. Score is determined by adding the numerals on each cube employed, with cubes used both horizontally and vertically being counted twice. Blanks are counted zero and unused cubes are subtracted from the score.

In an advanced embodiment of the invention any player challenging the spelling of a word must give the correct spelling using sign language. The interpreter card may be used at any time during a challenge, but if the challenger talks while challenging, the word is automatically correct. If the challenge is successful, the point value of the incorrect word is subtracted from his score. After a player completes his turn or is successfully challenged, the cubes are passed to the next player in clockwise rotation.

For the most part, the foregoing games may be played by one or more players. Obviously, the identification-type game can readily be played by a single individual; whereas, the word-forming games are better adapted for play by two or more persons.

Where the game is played by more than one player, more than one set of identical cubes may be advantageously employed. The additional set or sets facilitate taking turns and such additional sets may be differently colored to avoid getting the sets mixed up. In fact, when a board is employed for forming words crossword fashion, the use of additional sets makes it possible for all players to leave their words on the board during a round. Thus, the second player may build additional words off of the words formed by the first player, and the third player may use the words formed by the two preceding players, etc. In such a game, all words are removed from the board at the end of each round of play and each player takes a turn at starting play.

A game can be considered to be any predetermined number of points, such as a score of 220, or it can be the highest score at the end of a predetermined period of time or a predetermined number of throws. In the event a player cannot make a word from the playing cubes or forms an unacceptable word, the score value of the unused or improperly used cubes can be deducted from his total score. If the player does not have a sufficient score, he will go "in the hole" to the extent of the excess minus points.

While the indicia corresponding to the sign language alphabet or word signs therein have been illustrated in terms of their appearance to the viewer, it should be understood that the indicia on the cubes may appear thereon as the sign appears to the person making the particular sign.

Although this invention has been described with reference to certain embodiments, it is not intended that such embodiments shall be limitations upon the scope of the invention. It will be obvious to those skilled in the art that other modifications and variations can be made and various equivalents substituted therein without departing from the principles disclosed.

What is claimed is;

1. Educational game apparatus for teaching mute sign language adapted for use by one or more persons which comprises at least one set of at least five cubes, each cube face bearing indicia corresponding to a letter of the sign language finger spelling alphabet or a word in the hand sign language, said cube faces containing all 26 letters of the sign language finger spelling alphabet; and at least one interpreter card bearing the entire sign language finger spelling alphabet and any hand word signs appearing on said cubes together with the Roman alphabetic or word equivalents thereof, whereby the cubes may be displayed and the letters or signs thereon identified.

2. Educational game apparatus as set forth in claim 1 wherein said set consists of ten to eighteen cubes; each said cube face bears thereon a hand sign for a letter of the sign language finger spelling alphabet and includes in addition a numerical score value, at least about 25 percent of the available cube faces exhibiting vowel signs; and said cubes are displayed by tossing whereby a person accumulates points by associating the tossed cubes to form at least one word.

3. Educational game apparatus as set forth in claim 1 wherein each cube face further includes a numerical score value whereby a player may achieve a point total by correct identification of said letters or signs on the displayed cubes within a set period of time.

4. Educational game apparatus in accordance with claim 2 which further includes a playing board having means thereon dividing the board into a plurality of areas on which the cubes are placed to form words.

5. Educational game apparatus as set forth in claim 4 wherein said playing board includes areas having supplemental values.

6. Educational game apparatus as set forth in claim 2 which further includes a timer.

* * * * *